(12) United States Patent
Grover et al.

(10) Patent No.: US 10,123,155 B2
(45) Date of Patent: Nov. 6, 2018

(54) SECONDARY-CONNECTED DEVICE COMPANION APPLICATION CONTROL OF A PRIMARY-CONNECTED DEVICE

(71) Applicant: MYINE ELECTRONICS, INC., Ferndale, MI (US)

(72) Inventors: Joey Ray Grover, Madison Heights, MI (US); Justin Dickow, Royal Oak, MI (US); Scott Smereka, Warren, MI (US); Joel J. Fischer, Royal Oak, MI (US); John Byrne, Detroit, MI (US); Corey Maylone, Berkley, MI (US)

(73) Assignee: Livio, Inc., Royal Oak, MI (US)

( * ) Notice: Subject to any disclaimer, the term of this patent is extended or adjusted under 35 U.S.C. 154(b) by 9 days.

(21) Appl. No.: 15/002,058

(22) Filed: Jan. 20, 2016

(65) Prior Publication Data

US 2017/0208422 A1    Jul. 20, 2017

(51) Int. Cl.
| H04B 7/00 | (2006.01) |
| H04W 4/00 | (2018.01) |
| H04W 8/00 | (2009.01) |
| H04W 4/80 | (2018.01) |

(52) U.S. Cl.
CPC ............ *H04W 4/008* (2013.01); *H04W 4/80* (2018.02); *H04W 8/005* (2013.01)

(58) Field of Classification Search
None
See application file for complete search history.

(56) References Cited

U.S. PATENT DOCUMENTS

| 6,587,905 | B1 * | 7/2003 | Correale, Jr. ......... G06F 13/364 |
| | | | 710/107 |
| 7,436,300 | B2 * | 10/2008 | Glass ....................... G06F 21/31 |
| | | | 340/568.1 |
| 8,601,518 | B1 * | 12/2013 | Wen ................. H04N 21/41422 |
| | | | 725/62 |
| 8,831,585 | B2 | 9/2014 | Nicholson et al. |
| 8,914,012 | B2 | 12/2014 | Crosbie et al. |
| 9,432,828 | B1 * | 8/2016 | Tu ........................... H04W 4/22 |
| 2011/0093154 | A1 * | 4/2011 | Moinzadeh ............. B60R 25/00 |
| | | | 701/31.4 |
| 2012/0110511 | A1 * | 5/2012 | Howard ................. G01C 21/36 |
| | | | 715/835 |

(Continued)

OTHER PUBLICATIONS

"About SmartDeviceLink," 2 pages, retrieved Jan. 20, 2016, http://projects.genivi.org/smartdevicelink/about.

*Primary Examiner* — Zhiyu Lu
(74) *Attorney, Agent, or Firm* — Jennifer M. Stec; Brooks Kushman P.C.

(57) ABSTRACT

A vehicle may display a user interface of an application based on command information received from a primary-connected device, and send the command information to a secondary-connected device providing an auxiliary user interface. The vehicle may also forward a command message received based on user input to the auxiliary user interface to the application of the primary-connected device. The vehicle may also access paired device data to confirm that the secondary-connected device is authorized to command the application; and forward the user input to the primary-connected device if the secondary-connected device is authorized to command the application.

18 Claims, 8 Drawing Sheets

(56) References Cited

U.S. PATENT DOCUMENTS

| | | | |
|---|---|---|---|
| 2013/0157568 A1* | 6/2013 | Jain | H04W 24/08 455/41.2 |
| 2013/0244634 A1* | 9/2013 | Garrett | G06F 9/445 455/418 |
| 2014/0163771 A1 | 6/2014 | Demeniuk | |
| 2014/0277937 A1* | 9/2014 | Scholz | G06F 7/00 701/36 |
| 2014/0379801 A1* | 12/2014 | Gupta | H04L 67/306 709/204 |
| 2015/0015479 A1* | 1/2015 | Cho | G06F 3/013 345/156 |
| 2015/0051787 A1* | 2/2015 | Doughty | G07C 5/008 701/31.5 |
| 2015/0089092 A1* | 3/2015 | Voto | G06F 13/4282 710/14 |
| 2015/0099495 A1* | 4/2015 | Crosbie | B60W 50/14 455/414.3 |
| 2015/0192426 A1* | 7/2015 | Foster | G01C 21/3629 715/765 |
| 2016/0041941 A1* | 2/2016 | Kessler | H05K 999/99 700/3 |
| 2016/0352886 A1* | 12/2016 | Dickow | H04B 1/3822 |

* cited by examiner

SECONDARY-CONNECTED DEVICE COMPANION APPLICATION CONTROL OF A PRIMARY-CONNECTED DEVICE

TECHNICAL FIELD

Aspects of the disclosure generally relate to control of various applications of a primary-connected device from a companion application installed to secondary-connected devices.

BACKGROUND

To pair a phone or other mobile device with a vehicle, the user may enable BLUETOOTH on the device to be paired, and select from the vehicle computing system to begin the pairing process. To complete the pairing, the vehicle may display a personal identification number (PIN), and the user may enter the PIN into the device to be paired to the vehicle. Upon successful entry of the PIN, the vehicle computing system may display a message indicating that the mobile device is paired to the vehicle. Once paired, the vehicle and mobile device may automatically connect.

SmartDeviceLink (SDL) is a standard set of protocols and messages that connect applications on a smartphone to a vehicle head unit. This messaging enables a consumer to interact with their application using common in-vehicle interfaces such as a touch screen display, embedded voice recognition, steering wheel controls and various vehicle knobs and buttons. There are three main components that make up the SDL ecosystem. The Core component is the software which Vehicle Manufacturers (OEMs) implement in their vehicle head units. Integrating this component into their head unit and HMI based on a set of guidelines and templates enables access to various smartphone applications. The optional SDL Server can be used by Vehicle OEMs to update application policies and gather usage information for connected applications. The iOS and Android libraries are implemented by app developers into their applications to enable command and control via the connected head unit.

SUMMARY

In a first illustrative embodiment, a system includes a display; and a processor of a vehicle, programmed to send, to the display, a user interface of an application based on command information received from a primary-connected device, send the command information to a secondary-connected device providing an auxiliary user interface, and forward a command message received based on user input to the auxiliary user interface to the application of the primary-connected device.

In a second illustrative embodiment, a method includes accessing paired device data to determine which mobile device is a primary-connected device and which is a secondary-connected device; providing a user interface of an application executed by the primary-connected device to a display of a vehicle based on command information received from the primary-connected device; and routing the command information to the secondary-connected device to display an auxiliary user interface corresponding to the user interface.

In a third illustrative embodiment, a non-transitory computer-readable medium, comprising instructions of a connection hub application that, when executed by a processor of a computing platform of a vehicle, cause the computing platform to send, to a display of the vehicle, a user interface of an application executed by a primary-connected device based on command information received from the primary-connected device; send, to a secondary-connected device, the command information received from the primary-connected device to cause the secondary-connected device to display an auxiliary user interface corresponding to the user interface; receive a command message from the secondary-connected device responsive to input to the auxiliary user interface of the secondary-connected device; access the paired device data to confirm that the secondary-connected device is authorized to command the application; and forward the command message to the primary-connected device when the secondary-connected device is authorized to command the application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may allow for multiple devices to be paired to the vehicle. Yet, in many cases only one device may be connected to the vehicle as the driver or primary device. Various approaches may be used by the vehicle to choose which device is the primary device when multiple connected devices are available. In an example, the user may choose a device to be the favorite device that is preferred to be connected even if other paired devices are detected.

The device connected with the vehicle as the primary device may be provided with additional functionality by the vehicle computing system. For instance, the connected device may be provided with access to audio functionality of the vehicle, such as to receive audio from a vehicle microphone or to playback audio through the vehicle sound system. As another example, the primary device may be provided with an ability to execute applications on the paired device that may be controlled via a display of the head unit. To support the connected operation of the primary mobile device, the vehicle computing platform may implement a core messaging component configured to pass messages between applications installed to connected mobile devices and the functionality of the vehicle HMI. Additionally, the primary mobile device may implement a messaging proxy configured to pass messages from the mobile applications to the vehicle computing platform. In an example, the messages may be formulated according to the smart device link (SDL) protocol.

When connected to the vehicle computing platform, the primary device's input screen may be disabled. However, the driver and/or passengers of the vehicle may be able to control the applications via the head unit display. Passengers who are unable to reach the head unit display, however, may be unable to view or control the applications.

A companion application may be installed to the passenger or secondary mobile devices. The secondary mobile devices may connect to the vehicle computing system to which the primary device is also connected. Once connected, the core messaging component of the vehicle computing system may provide messaging information to the companion application of the secondary mobile devices based on the messaging received by the vehicle computing system from the primary device. The companion application may use the messaging information received from the head unit to provide an auxiliary user interface on a display of the secondary device. The core messaging component of the vehicle computing system may also receive command information from the secondary mobile devices responsive to user input to the auxiliary user interface, and relay that command information to the primary device. Thus, by using the companion application, the passengers may be provided with display and control of the applications being executed by the primary device.

Figure 1:
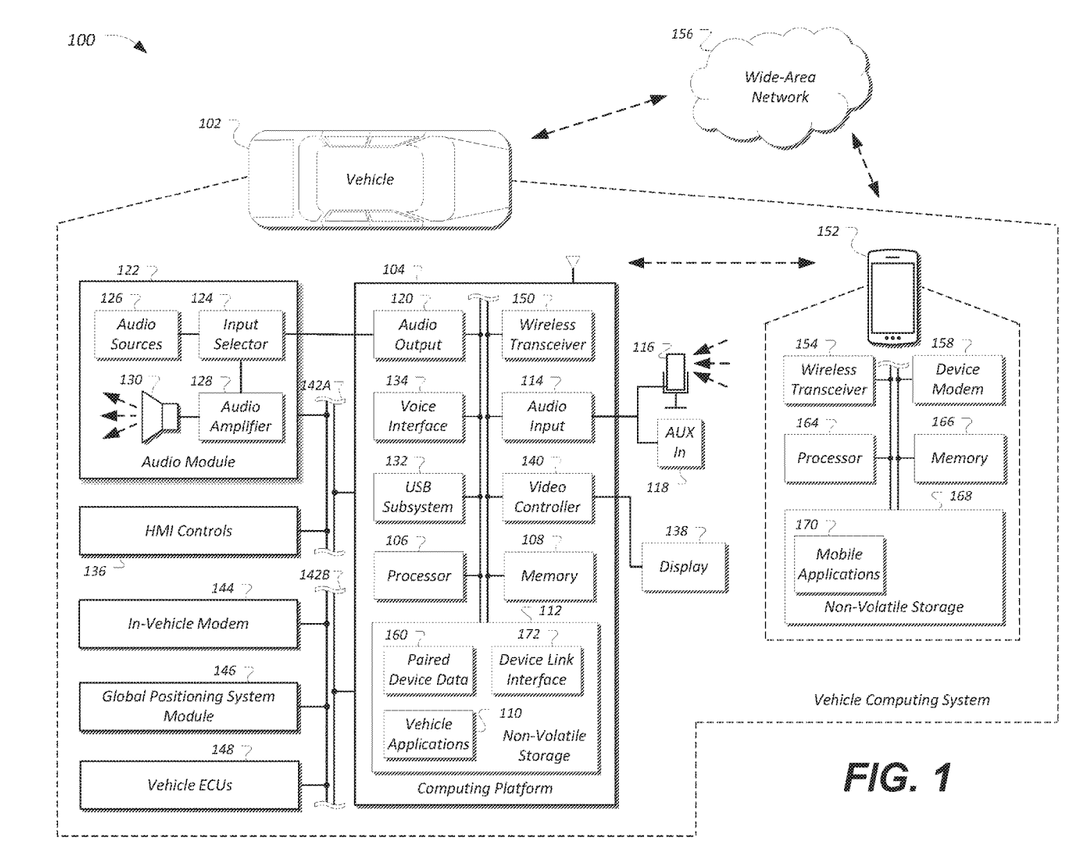
FIG. 1 illustrates an example diagram of a system that may be used to provide telematics services to a vehicle.

FIG. 1 illustrates an example diagram of a system 100 that may be used to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 connected with both a memory 108 and a computer-readable storage medium 112 and configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory (e.g., tangible) medium that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a wired jack, such as a stereo input, or a wireless input, such as a BLUETOOTH audio connection. In some examples, the audio input 114 may be configure to provide audio processing capabilities, such as pre-amplification of low-level signals, and conversion of analog inputs into digital data for processing by the processor 106.

The computing platform 104 may also provide one or more audio outputs 120 to an input of the audio playback functionality of the audio module 122. In other examples, the computing platform 104 may provide audio output to the occupants through use of one or more dedicated speakers (not illustrated). The audio module 122 may include an input selector 124 configured to provide audio content from a selected audio source 126 to an audio amplifier 128 for playback through vehicle speakers 130. The audio sources 126 may include, as some examples, decoded amplitude modulated (AM) or frequency modulated (FM) radio signals, and compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a grammar of available commands, and voice prompt generation for output via the audio module 122. In some cases, the system may be configured to temporarily mute, fade, or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke computing platform 104 functions (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as an vehicle modem 144 (which may not be present in some configurations), a global positioning system (GPS) module 146 configured to provide current vehicle 102 location and heading information, and various vehicle ECUs (Electronic Control Units) 148 configured to provide other types of information regarding the systems of the vehicle 102. As some non-limiting possibilities, the vehicle ECUs 148 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142, and the vehicle modem 144, GPS module 146, and vehicle ECUs 148 may communicate with the computing platform 104 over a second in-vehicle network 142. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The wide-area network 156 may provide communications services, such as packet-switched network services (e.g., Internet access, VoIP communication services), to devices connected to the wide-area network 156. An example of a wide-area network 156 may include a cellular telephone network. Mobile devices 152 may provide network connectivity to the wide-area network 156 via a device modem 158 of the mobile device 152. To facilitate the communications over the wide-area network 156, mobile devices 152 may be associated with unique device identifiers (e.g., mobile device numbers (MDNs), Internet protocol (IP) addresses, mobile station international subscriber directory numbers (MSISDNs), international mobile subscriber identity (IMSI), etc.) to identify the communications of the mobile devices 152 over the wide-area network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, secret information shared between the paired device and the computing platform 104 such as link keys, and/or personal identification numbers (PINs), and most recently used or device priority information, such that the computing platform 104 may automatically reconnect to the mobile devices 152 matching data in the paired device data 160 without user intervention. In some cases, the paired device data 160 may also indicate additional or options related to the permissions or functionality of the computing platform 104 that the paired mobile device 152 is authorized to access when connected.

When a paired mobile device 152 that supports network connectivity is automatically or manually connected to the computing platform 104, the mobile device 152 may allow the computing platform 104 to use the network connectivity of the device modem 158 to communicate over the wide-area network 156. In one example, the computing platform 104 may utilize a data-over-voice connection over a voice call or a data connection of the mobile device 152 to communicate information between the computing platform 104 and the wide-area network 156. Additionally or alternately, the computing platform 104 may utilize the vehicle modem 144 to communicate information between the computing platform 104 and the wide-area network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 or other locally-networked devices and with the wide-area network 156.

Figure 2A:
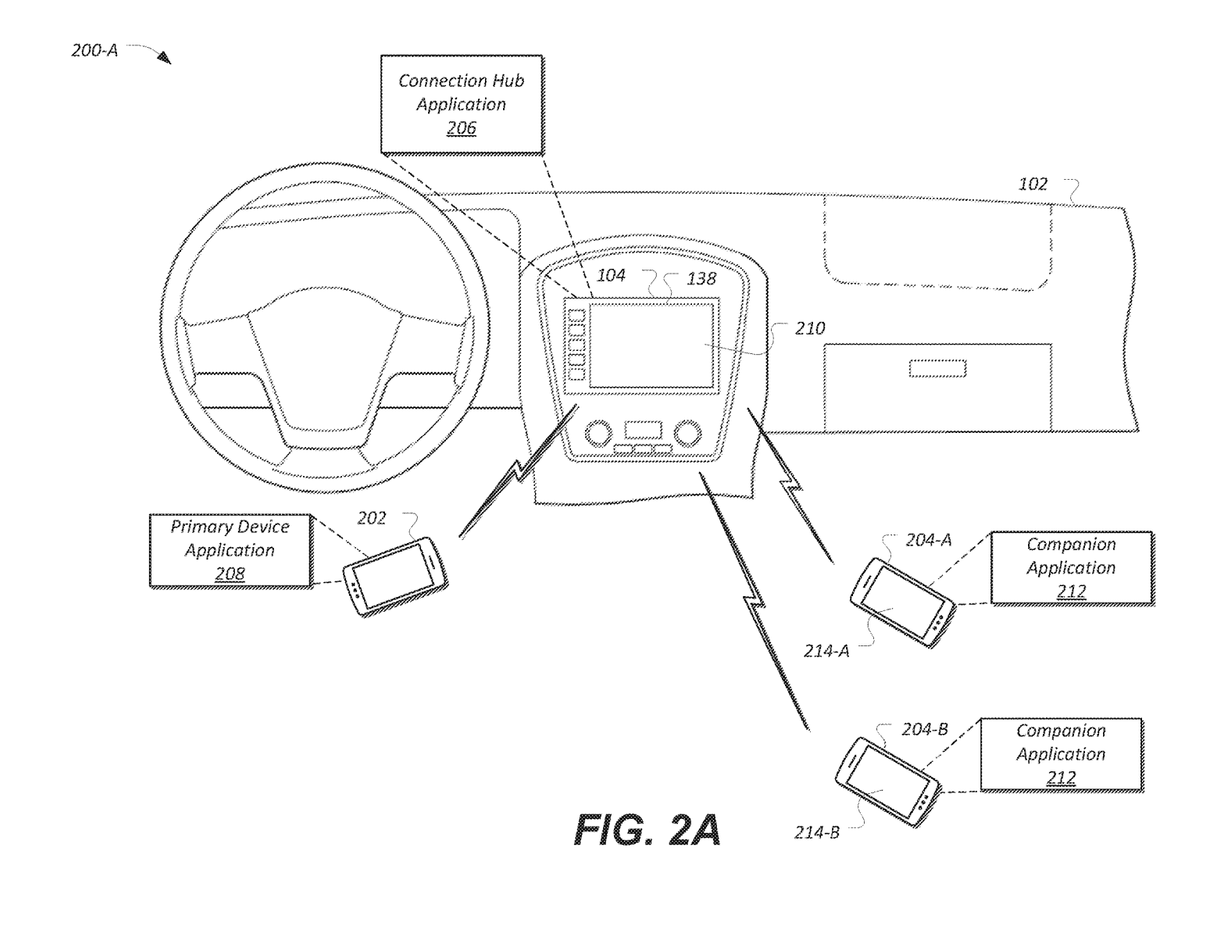
FIG. 2A illustrates an example diagram of the system configured for application control of a primary-connected device from one or more secondary-connected devices.

FIG. 2A illustrates an example diagram 200-A of the system 100 configured for application control of a primary-connected device 202 from one or more secondary-connected devices 204. As illustrated, the vehicle 102 include a display 138 mounted in a HMI control area between the driver and front passenger seats. The vehicle 102 also includes a primary-connected device 202 and secondary-connected devices 204-A and 204-B (collectively 204) connected to the computing platform 104. A connection hub 206 is installed to the computing platform 104 to manage the primary-connected device 202 and the secondary-connected devices 204. A primary device application 208 is installed to the primary-connected device 202 and executed by the primary-connected device 202 using the display 138 of the computing platform 104. A companion application 212 is installed to each of the secondary-connected devices 204. When executed, the companion application 212 may allow the secondary-connected devices 204 to control the primary device application 208 using the services of the connection hub 206. It should be noted that this configuration is merely an example, and systems having more or fewer secondary-connected devices 204 or varied device layouts are possible.

The primary-connected device 202 may be a mobile device 152 connected to the computing platform 104 as the primary device. As an example, the primary-connected device 202 may be designated as being a favorite device in the paired device data 160, such that the computing platform 104 may automatically reconnect to the primary-connected device 202 as the primary-connected device 202 when the primary-connected device 202 is identified by the wireless transceiver 150 as being within the vehicle 102. As another example, the primary-connected device 202 may be designated in the paired device data 160 as being a highest priority device compared to other located devices within the vehicle 102, such that the computing platform 104 may automatically reconnect to the primary-connected device 202 as the primary-connected device 202. As yet a further example, the primary-connected device 202 may be the first device identified in the paired device data 160 that is located within the vehicle (or a random one of the devices).

The secondary-connected devices 204 may include other mobile devices 152 connected to the computing platform 104 but that are not connected as the primary device. As an example, the secondary-connected device 204 may include devices having entries in the paired device data 160 that are not the favorite or highest priority device.

The connection hub 206 may be configured to manage the connections of the primary-connected device 202 and the secondary-connected devices 204. In an example, the connection hub 206 may be configured to receive signals from the wireless transceiver 150 to detect the mobile devices 152 located within the vehicle 102, and access the paired device data 160 to determine whether the identified mobile devices 152 are paired with the vehicle 102. Based on the located devices and paired device data 160, the connection hub 206 may be further configured to cause the computing platform 104 to connect to the mobile devices 152 that are authorized to connect to the computing platform 104. It should be noted that many examples herein relate to connections over BLUETOOTH, but the mobile devices 152 may additionally or alternately communicate with the connection hub 206 via other connection types, such as via universal serial bus (USB), Android open accessory (AOA), and/or transmission control protocol (TCP) as some other possibilities.

The connection hub 206 may further be configured to update the connections of devices to the computing platform 104. In an example, if the connection hub 206 identifies a new mobile device 152 that has higher priority than the current primary-connected device 202, the connection hub 206 may cause the computing platform 104 to connect to the new mobile device 152 as the primary-connected device 202, and to reconnect to former primary-connected device 202 as a secondary-connected device 204. In other examples, the connection hub 206 may make the determination of the primary-connected device 202 once, and may not update the determination.

The primary device application 208 may be an application installed to the primary-connected device 202 and configured to be executed by the primary-connected device 202 using the features of connected the computing platform 104. In an example, the primary device application 208 may be an audio streaming application configured to stream audio content from a server connected to the wide-area network 156 for playback by the audio playback functionality of the audio module 122. In another example, the primary device application 208 may be a navigation application, and may provide directions and audio commands to the driver to direct the vehicle 102 to a destination location. In an example, the connection hub 206 may be configured to discover the applications installed to the primary-connected device 202 that are compatible with display on the vehicle HMI, and may provide a listing of the available applications to the display 138. A user may accordingly be able to activate an application based on selection from the listing, e.g., via input to the display 138 or via voice input to the voice interface 134.

When executed in communication with the connection hub 206, the primary device application 208 may be configured to provide a user interface 210 to the display 138 of the computing platform 104. The user interface 210 may allow for a user to receive visual output from the primary device application 208 and/or provide input to the primary device application 208.

The companion application 212 may be an application installed to each of the secondary-connected devices 204. The companion application 212 may be executed by the secondary-connected devices 204 to provide for auxiliary view and control of the primary device application 208 being executed by the primary-connected device 202. A user of one of the secondary-connected devices 204 may utilize the auxiliary user interface 214 provided by the companion application 212 to monitor and/or control the functionality of the primary device application 208, despite the user being unable to reach the display 138 of the computing platform 104.

Figure 2B:
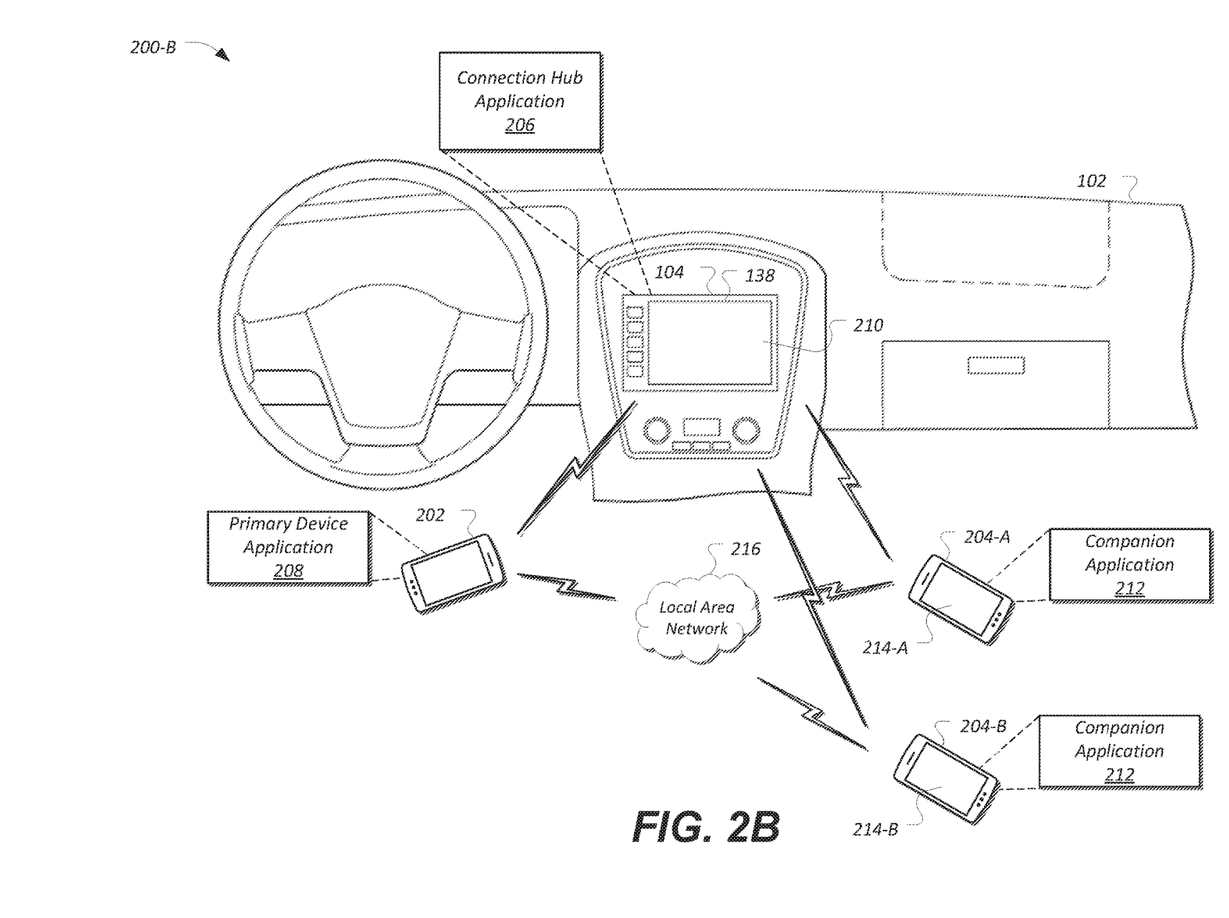
FIG. 2B illustrates an alternate example diagram of a system configured for application control of primary-connected devices from secondary-connected devices.

FIG. 2B illustrates an alternate example diagram 200-B of the system 100 configured for application control of a primary-connected device 202 from one or more secondary-connected devices 204. As shown in the diagram 200-B, the primary-connected device 202 and secondary-connected devices 204 may be additionally configured to communicate with one another via a local-area network 216. The local-area network 216 may include a network local to or within the vehicle 102 over which the primary-connected device 202 and secondary-connected devices 204 may communicate command messaging or other information. In one non-limiting example, the local-area network 216 may include a wireless local-area network or Wi-Fi network operating in accordance with the IEEE 802.11 specification.

Figure 3:
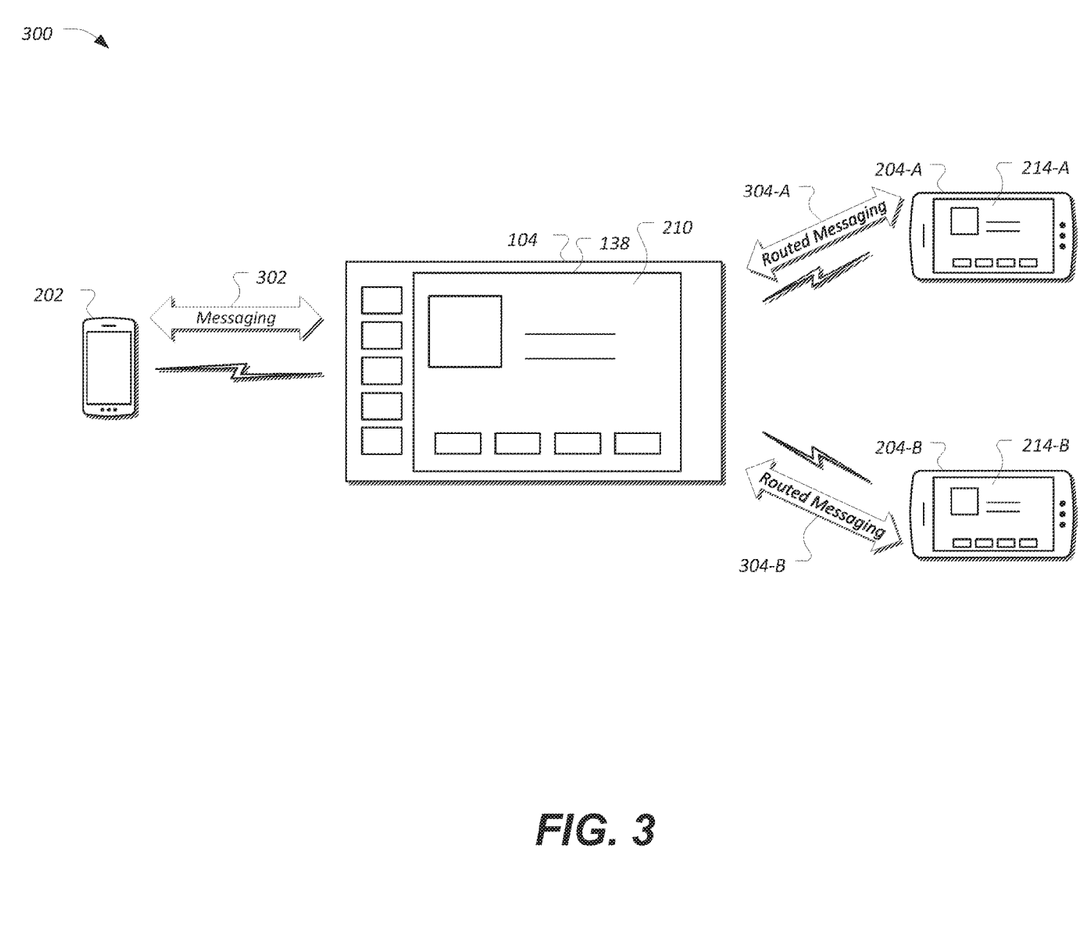
FIG. 3 illustrates an example diagram of user interface messaging between the primary-connected device, the secondary-connected devices, and the vehicle computing platform.

FIG. 3 illustrates an example diagram 300 of user interface messaging between the primary-connected device 202, the secondary-connected devices 204, and the vehicle computing platform 104. As shown, a messaging 302 flow may be provided between the primary-connected device 202 and the computing platform 104. Additionally, routed messaging 304 may be provided between the secondary-connected devices 204 and the computing platform 104. As shown, routed messaging 304-A is provided between the secondary-connected device 204-A and the computing platform 104, and routed messaging 304-B is provided between the secondary-connected device 204-B and the computing platform 104. It should be noted that this configuration is merely an example, and systems having more or fewer secondary-connected devices 204 or varied device layouts are possible. However, it should be noted that in many examples each secondary-connected device 204 providing the auxiliary user interface 214 may utilize a separate routing messaging 304 flow.

The messaging 302 may include data communications configured to facilitate providing the user interface 210 to the computing platform 104 from the primary-connected device 202. For instance, the messaging 302 may include SDL messaging provided by the primary device application 208 to the connection hub 206.

The routed messaging 304 include data configured to facilitate providing the auxiliary user interface 214 to the secondary-connected devices 204 from the computing platform 104. In an example, the routed messaging 304 may include some, or all, or a modified version of the messaging 302 received by connection hub 206 from the primary-connected device 202. Thus, in the example that the messaging 302 includes SDL messaging, the routed messaging 304 may also include SDL messaging.

The secondary-connected device 204 may receive the routed messaging 304 over its connection to the computing platform 104, and may display the auxiliary user interface 214 on the display of the secondary-connected device 204. For example, when executed by the secondary-connected device 204, the companion application 212 may send a message to the connection hub 206 of the computing platform 104 requesting for the computing platform 104 to provide the routed messaging 304 for generation of the auxiliary user interface 214. Responsive to receipt of the request, the connection hub 206 may determine whether the secondary-connected device 204 is authorized to receive the auxiliary user interface 214, and, if so, may begin sending the routed messaging 304. The user of the secondary-connected device 204 may accordingly be able to use the secondary-connected device 204 as an auxiliary view of the primary device application 208 being executed by the primary-connected device 202. By using the routed messaging 304 forwarded from the primary-connected device 202 by the connection hub 206, the auxiliary user interface 214 may accordingly include content corresponding to the user interface 210 to the display 138 of the computing platform 104.

Figure 4A:
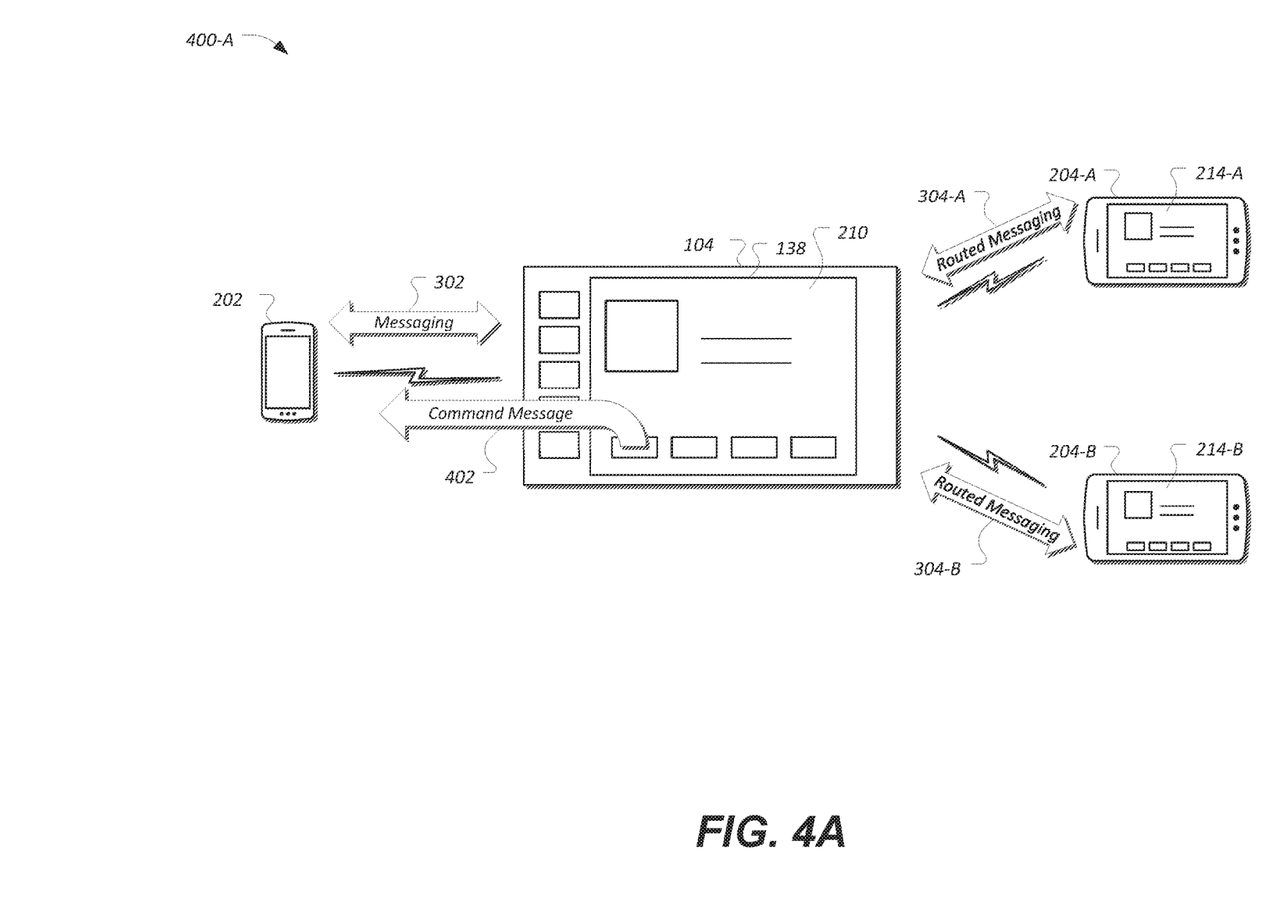
FIG. 4A illustrates an example diagram of a user of the computing platform providing user input to the primary device application being executed by the primary-connected device.

FIG. 4A illustrates an example diagram 400-A of a user of the computing platform 104 providing user input to the primary device application 208 being executed by the primary-connected device 202. In an example, a user may provide input to the display 138, such as by pressing a button or other control of the user interface 210 of the primary device application 208. Responsive to the input, the connection hub 206 may send a command message 402 to the primary-connected device 202 over the connection between the computing platform 104 and the primary-connected device 202.

The command message 402 may include information to be sent from the computing platform 104 to the primary-connected device 202 to inform the primary-connected device 202 of the user input to the display 138. In an example, the command message 402 may include an indication of a user interface control that was selected by the user (e.g., an SDL command message). The primary-connected device 202 may receive the command message 402 and may provide the message 402 to the primary device application 208 to control the operation of the primary device application 208.

Responsive to the command message 402, the primary device application 208 may send messaging 302 to the connection hub 206 to update the user interface 210. The connection hub 206 may accordingly use the messaging 302 flow to update the user interface 210, as well as to provide routed messages 304 to the secondary-connected devices 204 to cause the companion applications 212 to correspondingly update the auxiliary user interfaces 214.

Figure 4B:
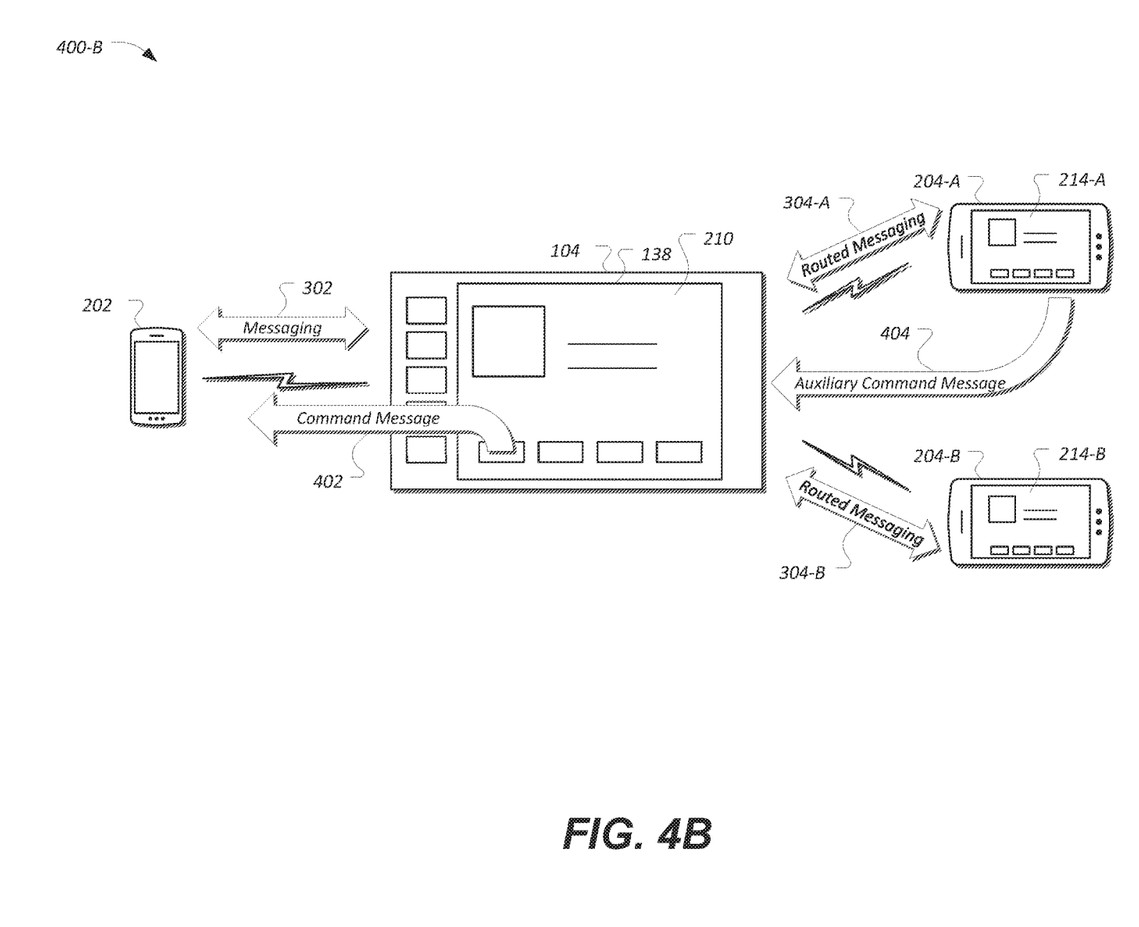
FIG. 4B illustrates an example diagram of a user of one of the secondary-connected devices providing user input to the primary device application being executed by the primary-connected device.

FIG. 4B illustrates an example diagram 400-B of a user of one of the secondary-connected devices 204 providing user input to the primary device application 208 being executed by the primary-connected device 202. In an example, a user may provide input to the display of the secondary-connected device 204-A, such as by pressing a button or other control of the auxiliary user interface 214 provided by the companion application 212. Responsive to the input, the companion application 212 may send an auxiliary command message 404 to the computing platform 104 over the connection between the secondary-connected device 204 and the computing platform 104.

The connection hub 206 may receive the auxiliary command message 404, and may forward or otherwise send a command message 402 to the primary-connected device 202 over the connection between the computing platform 104 and the primary-connected device 202. In an example, the auxiliary command message 404 may be an SDL command, and the command message 402 may be the SDL command forwarded to the primary-connected device 202. Thus, from the perspective of the primary-connected device 202, input to the auxiliary user interface 214 displayed by the secondary-connected device 204 may be indistinguishable from input to the user interface 210 of the display 138 of the computing platform 104.

Figure 4C:
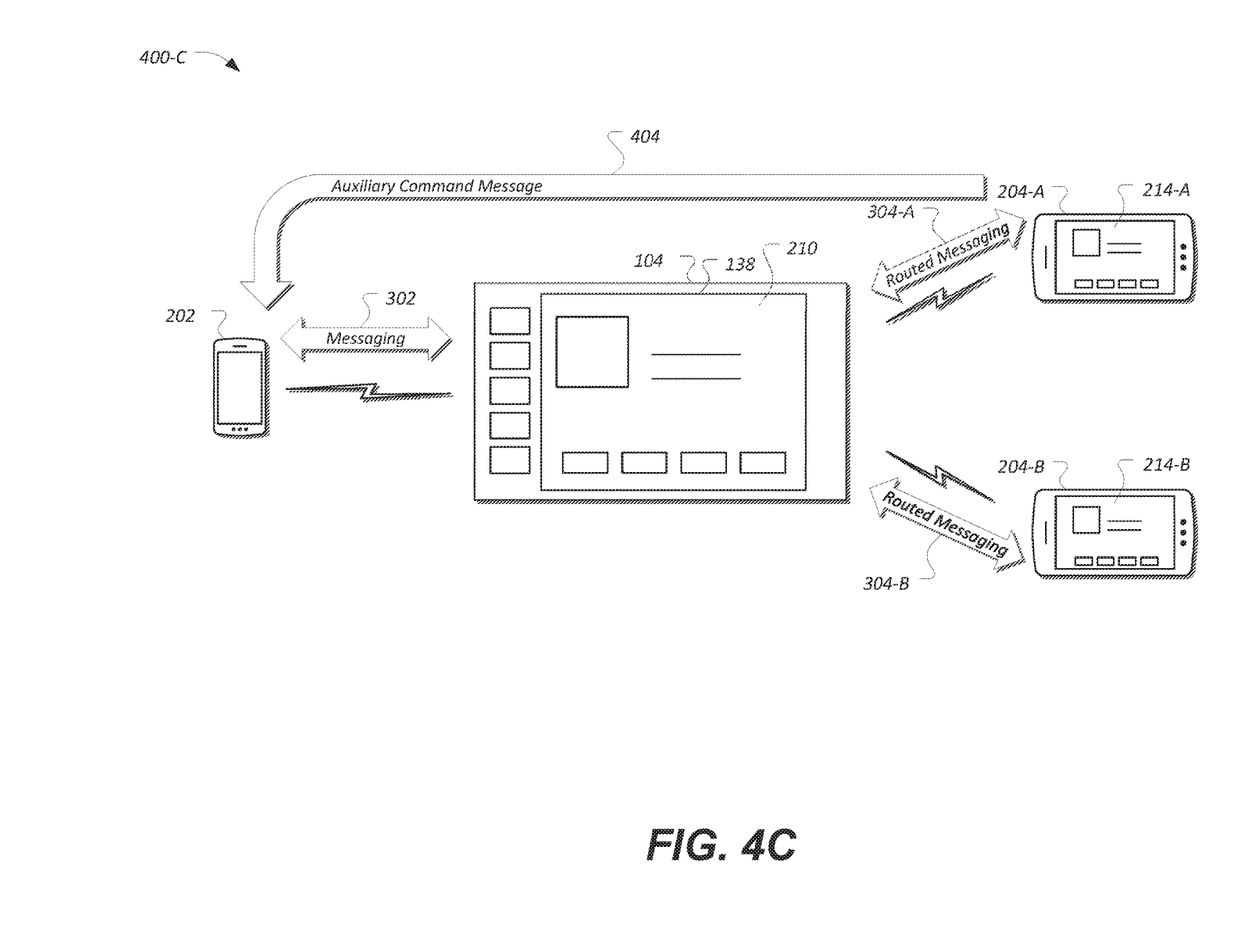
FIG. 4C illustrates an alternate example diagram of a user of one of the secondary-connected devices providing user input to the primary device application being executed by the primary-connected device.

FIG. 4C illustrates an alternate example diagram 400-C of a user of one of the secondary-connected devices 204 providing user input to the primary device application 208 being executed by the primary-connected device 202. As compared to the example diagram 400-B, in the example diagram 400-C the secondary-connected device 204-A provides the auxiliary command message 404 to the primary-connected device 202 without using the connection hub 206 as an intermediary. In an example, the secondary-connected device 204-A provides the auxiliary command message 404 to the primary-connected device 202 over the local-area network 216, e.g., as illustrated in the diagram 200-B.

Figure 5:
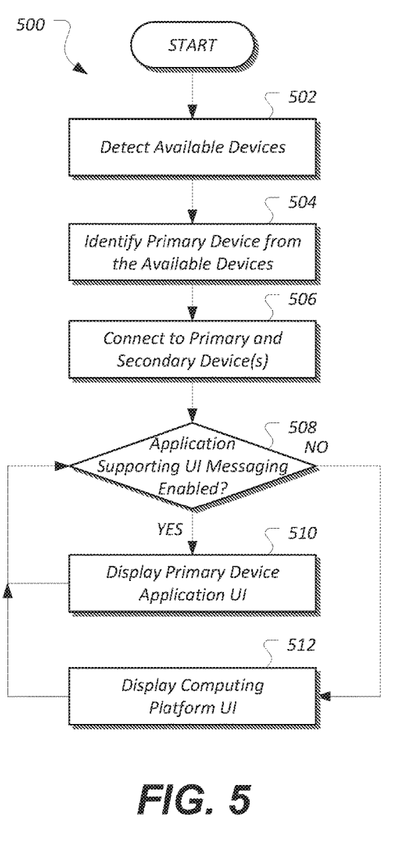
FIG. 5 illustrates an example process for connection of primary-connected devices and secondary-connected devices to the computing platform.

FIG. 5 illustrates an example process 500 for connection of primary-connected devices 202 and secondary-connected devices 204 to the computing platform 104. In an example, the process 500 may be performed by the connection hub 206 of the computing platform 104 in communication with one or more mobile devices 152.

At operation 502, the computing platform 104 detects available mobile devices 152. In an example, the connection hub 206 receives signals from the wireless transceiver 150 to detect the mobile devices 152 located within the vehicle 102. The connection hub 206 may also access the paired device data 160 to determine which of the identified mobile devices 152 are paired with the vehicle 102 and therefore available for connection.

At operation 504, the computing platform 104 identifies the primary-connected device 202 from the available mobile devices 152. In an example, the connection hub 206 accesses the paired device data 160 to determine which device should be paired as the primary device. As an example, the primary-connected device 202 may be designated as being a favorite device in the paired device data 160. As another example, the primary-connected device 202 may be designated in the paired device data 160 as being a highest priority device compared to other located devices within the vehicle 102. As yet a further example, the primary-connected device 202 may be the first device identified in the paired device data 160 that is located within the vehicle 102 or the device out of the available devices that was most recently paired to the computing platform 104 as the primary-connected device 202.

At operation 506, the computing platform 104 connects to the primary-connected device 202 and the secondary-connected devices 204. In an example, the connection hub 206 may connect the computing platform 104 to the primary-connected device 202 and the secondary-connected devices 204 wirelessly over BLUETOOTH connections between the wireless transceiver 150 of the computing platform 104 and the wireless transceivers 154 of the mobile devices 152.

At operation 508, the computing platform 104 determines whether an application supporting the user interface 210 is enabled. In an example, the user interface 210 may be enabled by a user selecting an application or option from the display 138 of the computing platform 104 to invoke display of the user interface 210 to the display 138. In another example, enabling of the user interface 210 to the display 138 may be initiated by the computing platform 104 responsive to connection of the primary-connected device 202 to the computing platform 104. In yet a further example, the user interface 210 to the display 138 may be initiated responsive to selection or execution of the primary device application 208 (e.g., responsive to selection of an icon representing the primary device application 208 from the display 138). If the user interface 210 is enabled, control passes to operation 510. Otherwise control passes to operation 512.

At operation 510, the computing platform 104 displays the user interface 210. In an example, the connection hub 206 may receive the messaging 302 from the primary-connected device 202, and may display the user interface 210 to the display 138 using the received messaging 302.

At operation 512, the computing platform 104 displays the user interface of the computing platform 104. In an example, the connection hub 206 may display the user interface generated by the computing platform 104 to the display 138 without using received messaging 302. When the user interface of the computing platform 104 is being displayed, the auxiliary user interface 214 may accordingly be disabled. After operation 512, control passes to operation 508.

Figure 6:
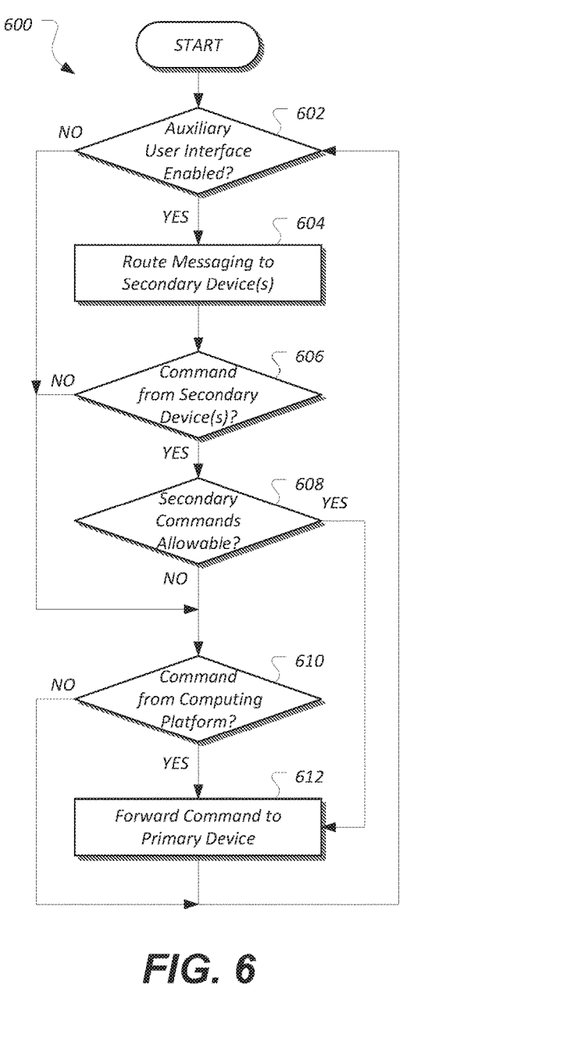
FIG. 6 illustrates an example process for application control of primary-connected devices from secondary-connected devices.

FIG. 6 illustrates an example process 600 for control of a primary device application 208 executed by the primary-connected device 202 from the secondary-connected devices 204. As with the process 500, the process 600 may also be performed by the connection hub 206 of the computing platform 104 in communication with one or more mobile devices 152.

At operation 602, the computing platform 104 determines whether the auxiliary user interface 214 is enabled for one or more of the secondary-connected devices 204. In an example, when a secondary-connected device 204 executes the companion application 212, the companion application 212 may direct the secondary-connected device 204 to request the auxiliary user interface 214 be provided to the secondary-connected device 204 over the device connection to the computing platform 104. Responsive to the request, the connection hub 206 may direct the computing platform 104 to provide the auxiliary user interface 214.

In some examples, the connection hub 206 may confirm additional prerequisites before providing the auxiliary user interface 214 to the secondary-connected device 204. As one possibility, the connection hub 206 may check the paired device data 160 to confirm that the secondary-connected device 204 has permission to receive the auxiliary user interface 214 from the computing platform 104. As another possibility, the connection hub 206 may check that the display 138 is currently providing a user interface 210 of the primary device application 208, and may confirm that the secondary-connected device 204 has permission to receive the auxiliary user interface 214 from the computing platform 104 for the particular primary device application 208 being displayed. As yet another possibility, the connection hub 206 may deny the request for the auxiliary user interface 214 if the computing platform 104 is not displaying a user interface 210 of the primary-connected device 202.

If providing the auxiliary user interface 214 to the secondary-connected device 204 is enabled, control passes to operation 604. Otherwise, control passes to operation 610.

At operation 604, the computing platform 104 sends routed messaging 304 to the one or more of the secondary-connected devices 204 for which the auxiliary user interface 214 is enabled. In an example, the connection hub 206 may forward messaging 302 received from the primary-connected device 202 to generate the currently-displayed content on the display 138, and send the forwarded messaging in routed messaging 304 flows to the secondary-connected devices 204.

At operation 606, the computing platform 104 determines whether command input to the one or more of the secondary-connected devices 204 is received. In an example, a user may provide input to the display of the secondary-connected device 204-A, such as by pressing a button or other control of the auxiliary user interface 214 provided by the companion application 212. Responsive to the input, the companion application 212 may send an auxiliary command message 404 to the computing platform 104 over the connection between the secondary-connected device 204 and the computing platform 104. The connection hub 206 may accordingly receive the auxiliary command message 404.

At operation 608, the computing platform 104 determines whether the user input to the auxiliary user interface 214 is allowable. In an example, the connection hub 206 may access the paired device data 160 associated with the secondary-connected device 204 to identify whether the secondary-connected device 204 has access to control the primary device application 208 (or to control the particular primary device application 208). If so, control passes to operation 612. Otherwise, control passes to operation 610. In other examples, the connection hub 206 may omit operation 608, and control may pass to operation 612.

At operation 610, the computing platform 104 determines whether user input to the user interface 210 is received. In an example, a user may provide input to the display 138, such as by pressing a button or other control of the user interface 210 of the primary device application 208. The connection hub 206 may accordingly receive the input received from the display 138. If input is received, control passes to operation 612. Otherwise, control passes to operation 602.

At operation 612, the computing platform 104 forwards the command input to the primary-connected device 202. In an example, responsive to the input to the display 138 the connection hub 206 may generate the command message 402, and may send the command message 402 to the primary-connected device 202 over the connection between the computing platform 104 and the primary-connected device 202. In another example, responsive to the auxiliary command message 404 received from the one or more of the secondary-connected devices 204, the connection hub 206 may forward the auxiliary command message 404 as a command message 402 to the primary-connected device 202 over the connection between the computing platform 104 and the primary-connected device 202. The primary-connected device 202 may receive the command message 402 and may provide the input to the primary device application 208 to control the operation of the primary device application 208. Notably, the primary device application 208 may be unaware of whether the user input was to the display 138 of the computing platform 104, or to the display of a secondary-connected device 204. After operation 612, control passes to operation 602.

Variations on the process 600 are possible. In an example, the secondary-connected devices 204 may provide the auxiliary command message 404 to the primary-connected device 202 over the local-area network 216, without using the services of the connection hub 206.

Computing devices described herein, such as the computing platform 104, mobile devices 152, primary-connected devices 202, and secondary-connected devices 204, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a display of a vehicle; and
a processor of the vehicle, programmed to
access paired device data to determine which mobile device is a primary-connected device and which is a secondary-connected device,
send, to the display, a user interface of an application executed by the primary-connected device based on command information received from the primary-connected device,
send the command information to the secondary-connected device to cause the secondary-connected device to display an auxiliary user interface corresponding to the user interface, and
forward a command message received from the secondary-connected device based on user input to the auxiliary user interface to the application of the primary-connected device if the secondary-connected device is authorized to command the application.

2. The system of claim 1, further comprising:
a memory storing the paired device data; and
a wireless transceiver,
wherein the processor is further programmed to
using the wireless transceiver, detect mobile devices located within the vehicle; and
access the paired device data to determine which detected mobile device is the primary-connected device.

3. The system of claim 2, wherein the processor is further programmed to:
access the paired device data to determine capabilities of the secondary-connected device; and
send the command information to the secondary-connected device if the secondary-connected device is authorized to receive the command information.

4. The system of claim 3, wherein the capabilities of the secondary-connected device include permission to view the user interface of the application.

5. The system of claim 3, wherein the capabilities of the secondary-connected device include permission to view the user interface of the application and permission to command the application.

6. The system of claim 3, wherein the processor is further programmed to:
access the paired device data to determine capabilities of another secondary-connected device; and
send the command information to the other secondary-connected device if the other secondary-connected device is authorized to receive the command information.

7. The system of claim 2, wherein the processor is further programmed to:
access the paired device data to confirm that the secondary-connected device is authorized to command the application; and
forward the command message from the secondary-connected device to the application of the primary-connected device responsive to confirmation that the secondary-connected device is authorized to command the application.

8. The system of claim 1, wherein the command information is smart device link (SDL) protocol information, and the command message is an SDL command.

9. A method executed by a processor of a vehicle comprising:
accessing paired device data to determine which mobile device is a primary-connected device and which is a secondary-connected device;
providing a user interface of an application executed by the primary-connected device to a display of the vehicle based on command information received from the primary-connected device;
sending, to a secondary-connected device, the command information to cause the secondary-connected device to display an auxiliary user interface corresponding to the user interface;

receiving a command message from the secondary-connected device responsive to input to the auxiliary user interface of the secondary-connected device; and forwarding the command message to the primary-connected device if the secondary-connected device is authorized to command the application.

10. The method of claim 9, further comprising forwarding, by the vehicle, command input from the secondary-connected device to the application of the primary-connected device.

11. The method of claim 9, further comprising sending command input from the secondary-connected device over a local area network to the application of the primary-connected device.

12. The method of claim 9, further comprising accessing the paired device data to determine whether the secondary-connected device is authorized to command the application.

13. The method of claim 9, wherein the primary-connected device and the secondary-connected device are smartphones.

14. The method of claim 9, further comprising:
accessing the paired device data to determine capabilities of the secondary-connected device; and
routing the command information to the secondary-connected device if the capabilities indicate that the secondary-connected device is authorized to receive the command information.

15. The method of claim 14, further comprising:
accessing the paired device data to determine capabilities of another secondary-connected device; and
routing the command information to the other secondary-connected device if the capabilities indicate that the other secondary-connected device is authorized to receive the command information.

16. A non-transitory computer-readable medium, comprising instructions of a connection hub application that, when executed by a processor of a computing platform of a vehicle, cause the computing platform to:
send, to a display of the vehicle, a user interface of an application executed by a primary-connected device based on command information received from the primary-connected device;
send, to a secondary-connected device, the command information received from a primary-connected device to cause the secondary-connected device to display an auxiliary user interface corresponding to the user interface;
receive a command message from the secondary-connected device responsive to input to the auxiliary user interface of the secondary-connected device;
access the paired device data to confirm that the secondary-connected device is authorized to command the application; and
forward the command message to the primary-connected device if the secondary-connected device is authorized to command the application.

17. The medium of claim 16, further comprising instructions to cause the computing platform to send, to another secondary-connected device, the command information received from the primary-connected device to cause the other secondary-connected device to display a second auxiliary user interface corresponding to the user interface.

18. The medium of claim 16, further comprising instructions to cause the computing platform to:
access the paired device data to confirm that the secondary-connected device is authorized to command the application; and
forward the command message from the secondary-connected device to the application of the primary-connected device responsive to confirmation that the secondary-connected device is authorized to command the application.

* * * * *